US012514155B2

(12) United States Patent
Lovett et al.

(10) Patent No.: US 12,514,155 B2
(45) Date of Patent: Jan. 6, 2026

(54) WINDROW CENTER LINE DETECTION FOR MAPPING AND CONTROLLING OPERATION

(71) Applicant: Deere & Company, Moline, IL (US)

(72) Inventors: Benjamin M. Lovett, Ottumwa, IA (US); Darin L. Roth, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 718 days.

(21) Appl. No.: 17/896,388

(22) Filed: Aug. 26, 2022

(65) Prior Publication Data

US 2024/0065142 A1 Feb. 29, 2024

(51) Int. Cl.
*A01D 34/00* (2006.01)
*A01D 57/00* (2006.01)

(52) U.S. Cl.
CPC .......... *A01D 34/006* (2013.01); *A01D 57/00* (2013.01)

(58) Field of Classification Search
None
See application file for complete search history.

(56) References Cited

U.S. PATENT DOCUMENTS 9,791,863 B2 * 10/2017 Derscheid ........... A01F 15/0833
10,091,935 B2 10/2018 Treffer et al.
2005/0120696 A1 6/2005 Lohrentz et al.
2017/0118918 A1 5/2017 Chaney et al.
2021/0045292 A1 * 2/2021 Babler ................ A01D 89/008
2021/0059117 A1 * 3/2021 Hunt ..................... A01D 41/148
2021/0195825 A1 7/2021 Zhou
2021/0195827 A1 7/2021 Zhou
2021/0267121 A1 9/2021 Childs

FOREIGN PATENT DOCUMENTS

| CA | 2960511 A1 * | 10/2017 | .......... A01D 34/667 |
| EP | 0779020 A1 | 6/1997 | |
| EP | 0579573 B1 | 8/1997 | |
| EP | 2267567 A2 | 12/2010 | |

OTHER PUBLICATIONS

Shinners, K. J., & Schuler, R. T. (2019) Market Segmentation of Rakes and Related Equipment. (Year: 2019).*
Extended European Search Report and Written Opinion issued in European Patent Application No. 23190541.5 dated Apr. 29, 2024, in 09 pages.

* cited by examiner

*Primary Examiner* — Hitesh Patel
*Assistant Examiner* — Tabitha Kress
(74) *Attorney, Agent, or Firm* — Christopher J. Volkmann; Kelly, Holt & Christenson PLLC

(57) ABSTRACT

Mowing characteristics of a mowing operation are detected. The mowing characteristics indicate that the mower is engaged and also whether a merger component is engaged. A center line of a windrow is identified based upon a location of the mower and the mowing characteristics. An action signal is generated based upon the center line of the mower.

20 Claims, 11 Drawing Sheets

WINDROW CENTER LINE DETECTION FOR MAPPING AND CONTROLLING OPERATION

FIELD OF THE DESCRIPTION

The present description relates to agricultural machines. More specifically, the present description relates to agricultural machines that generate windrows of agricultural material.

BACKGROUND

There are a wide variety of different types of mobile agricultural machines. Some such machines include mowers or windrowers that engage material to be harvested, cut that material, and sometimes process it in other ways, and then drop the material in a windrow which is the subject of a later agricultural operation (such as a subsequent harvesting operation).

In one example, a windrower engages material in the field with a mower or cutting head. The mower severs the material and a conveyer system gathers the material and drops the material in a windrow beneath the center of the machine so that the windrow has a longitudinal axis that generally coincides with the travel path of the windrower. Some such windrowers also include merger components or grouper components (hereinafter referred to as merger components) which can be used to direct the placement of the windrow to one side, or the other, of the windrower. Therefore, when mowing two adjacent passes (traveling in opposite directions during each pass), the merger component can be used to place the windrows of the adjacent passes in overlapping relation to one another or directly adjacent one another. This results in a larger (e.g., double) windrow which includes material from both adjacent passes.

In still another example, the windrower can be operated along a first pass during which the merger component is not engaged so the windrower drops the first windrow beneath the center of the machine. Then, when the windrower travels along the adjacent passes on either side of the first pass, the merger component can be engaged so that the material is discharged toward the first windrow (while the machine is traveling along the adjacent passes) in order to form a triple windrow. Thus, the triple windrow, three windrows are placed adjacent one another (the windrow from the first pass and the windrows from the adjacent passes on either side of the first pass).

The discussion above is merely provided for general background information and is not intended to be used as an aid in determining the scope of the claimed subject matter.

SUMMARY

Mowing characteristics of a mowing operation are detected. The mowing characteristics indicate that the mower is engaged and whether a merger component is engaged. A center line location of a windrow is identified based upon a location of a windrower and the mowing characteristics. An action signal is generated based upon the center line location of the windrow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, windrowers engage material to be processed in a field and place that material in a windrow. The windrows of material are then engaged in a subsequent operation, by another mobile agricultural machine, such as a forage harvester or baler. If the location of the windrow is mapped, the map can greatly enhance the efficiency and effectiveness of subsequent farming operations, such as the harvesting operation or baling operation. For instance, if the location of the windrow is known when harvesting a field with a forage harvester, the location of the windrow may be used to perform route planning for the forage harvester. Similarly, if the quantity of material along the windrow is known, this can be used in a feed forward manner in order to estimate power consumption to control the ground speed of the forage harvester. The speed of the forage harvester can be controlled in order to maintain a desired level of mass flow of material through the forage harvester or for other reasons.

Also, as discussed above, some mowers (or windrowers) have a merger component. When the merger component is used, multiple windrows formed during different passes can be combined into one large windrow so that the one large windrow can be picked up with a forage harvester (or another machine), in one pass, instead of in multiple passes which would be required when the multiple windrows are not combined. However, merging windrows in this way can make it more difficult to identify the location of the windrows. For instance, when a windrower creates a single windrow, the location of the windrow may correspond to the center line of the path or route of the windrower through the field. However, when a merger component is used to generate a combined windrow, out of multiple windrows, it can be more difficult to identify the location of the center line (or longitudinal axis) of the combined windrow.

Therefore, the present description describes a system in which the windrow configuration (e.g., single, double, triple) is detected and the center line of the windrow is located based upon the windrow configuration. In one example, a control signal is generated based upon the location of the center line of the windrow. Also, in one example, the quantity of material in the windrow is also detected. The control signal can be generated based upon the location of the windrow and the quantity of material in the windrow as well.

Figure 1:
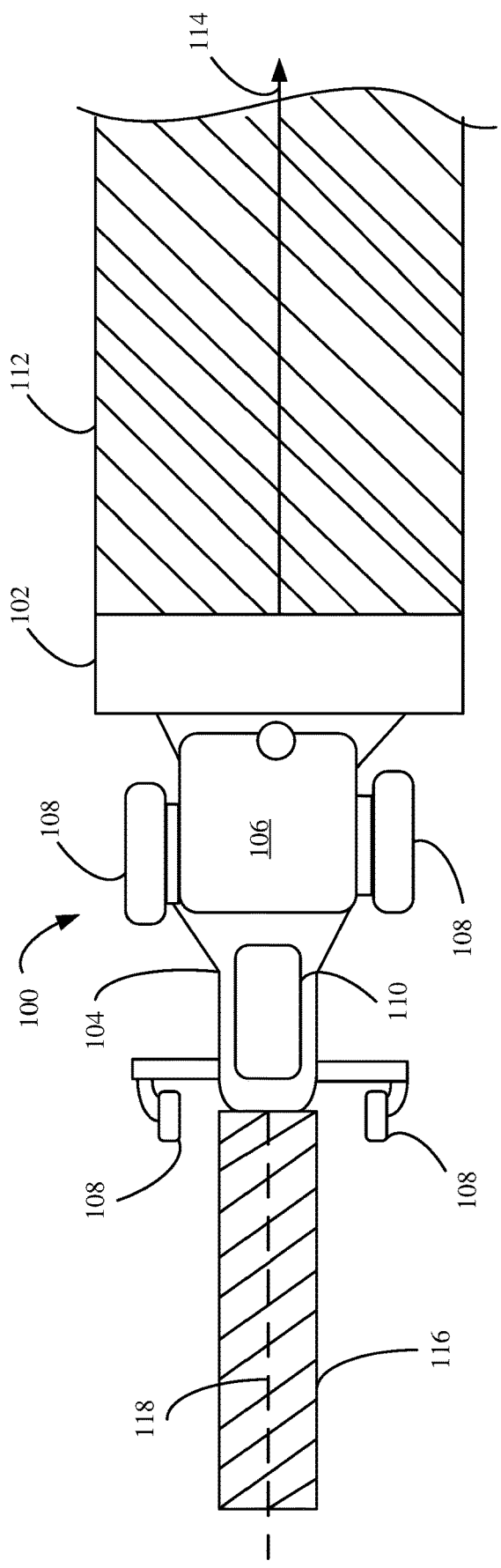
FIG. 1 is a pictorial illustration showing one example of a windrower generating a single windrow.

FIG. 1 is a pictorial illustration of a windrower 100 which includes a mower (or header) 102 carried by a frame 104 of windrower 100. Windrower 100 also includes an operator compartment 106 (which can be eliminated when windrower 100 is an autonomous vehicle) and a set of ground engaging elements, such as wheels, 108. Frame 104 can also carry a propulsion system, such as an engine 110 that drives one or more of the ground engaging elements 108 through a transmission. Of course, the propulsion system 110 can include a plurality of different motors that can drive ground engaging elements 108 individually, or in groups, or other propulsion systems.

In the example shown in FIG. 1, windrower 100 is using header or mower 102 (referred to hereinafter as mower 102) to engage crop 112 as windrower 100 travels in a direction indicated by arrow 114. The mower 102 mows the crop 112 and may include a material conveyance system (such as a draper belt or other conveyor) which gathers the mowed material together and deposits it in a windrow 116 as windrower 100 moves along the travel path 114. Windrower 100 is thus configured to drop a single windrow 116. The longitudinal axis (or center line) of windrow 116 is identified generally at 118. Where windrower 100 is dropping a single 9 windrow, without any merging or grouping of windrows, the longitudinal axis 118 of windrow 116 is generally aligned with the travel path 114 of windrower 100. In some examples, windrower 100 will include a guidance system that can be used to guide the steering or heading of windrower 100 along a guidance line that may be pre-mapped or otherwise generated ahead of time. The guidance system thus attempts to guide the heading of windrower 100 to follow the guidance line. In an example where such a guidance system is used, then the longitudinal axis 118 of windrower 116 may correspond to the guidance line that is used to guide windrower 100 along the travel path 114.

Figure 2:
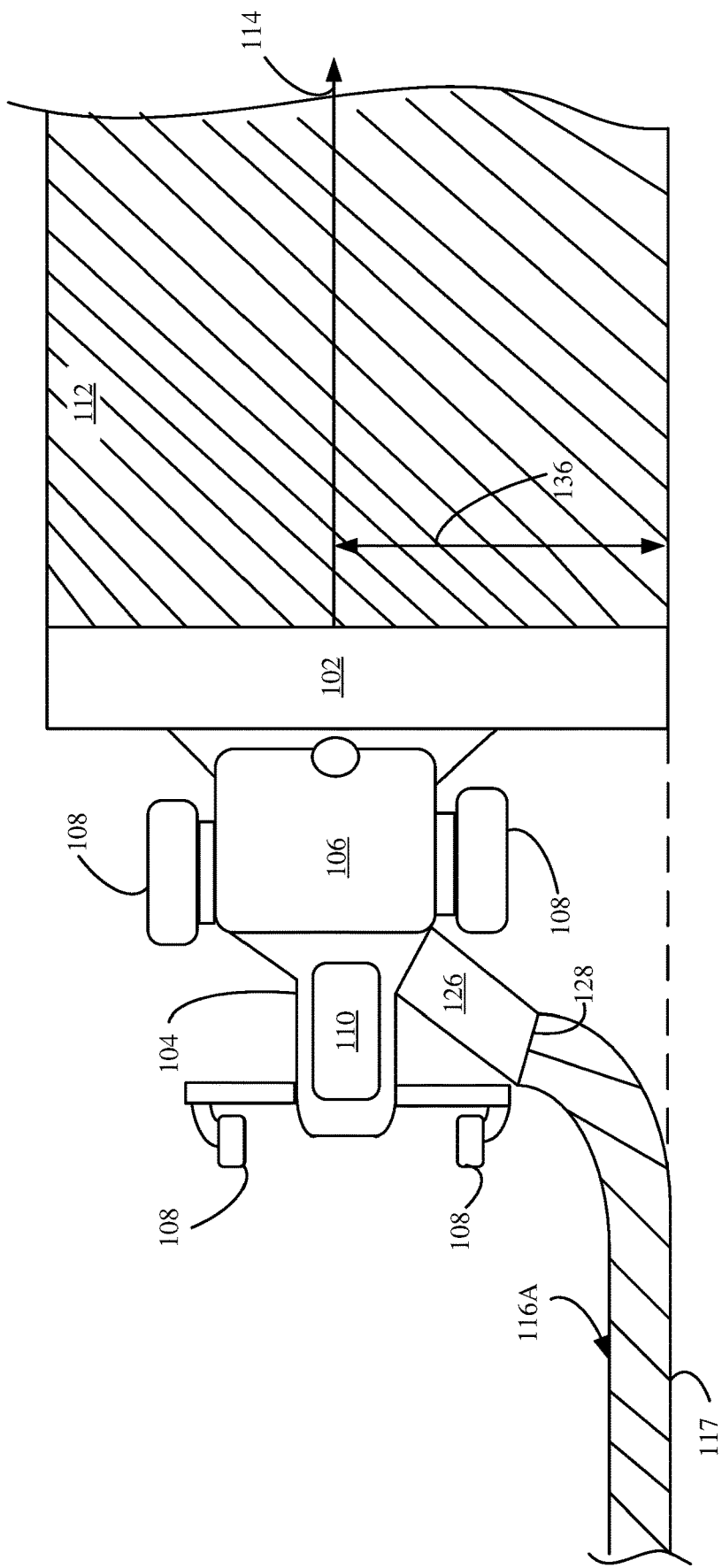
FIG. 2 is a pictorial illustration showing one example of a windrower with a merger component engaged.

FIG. 2 is similar to FIG. 1 except that, in FIG. 2, windrower 100 has a merger component 126 engaged. Merger component 126 discharges windrow 116A out of a discharge end 128 to the side of windrower 100 instead of directly behind windrower 100. Therefore, one side 117 of windrow 116A furthest from windrower 100 is offset from the travel path or guidance line 114 of windrower 100 by a distance 136 that is roughly equal to the distance of half of the cut width of mower 102.

Figure 3:
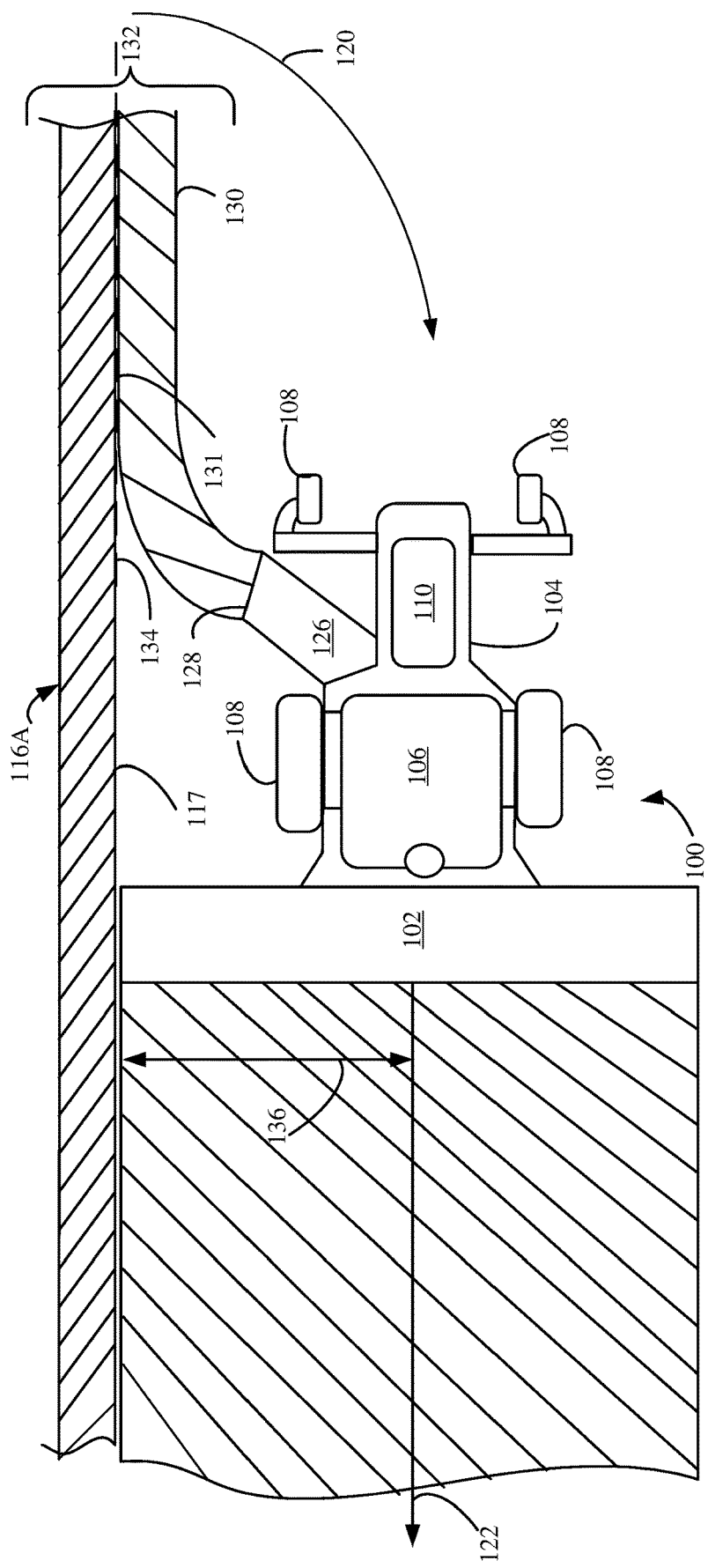
FIG. 3 is a pictorial illustration showing one example of a windrower with a merger component engaged to create a double windrow.

FIG. 3 is also a pictorial illustration of windrower 100 and some items, which are similar to those shown in FIG. 2, are similarly numbered in FIG. 3. In FIG. 3, windrower 100 has completed a first pass, placing windrow 116A (as discussed above with respect to FIGS. 2), and then has made a turn indicated by arrow 120 to make another pass, adjacent the first pass, so that windrower 100 is traveling generally in the direction indicated by arrow 122. Windrower 100 is engaging crop 124 and mower 102 is cutting that crop. FIG. 3 also shows that windrower 100 now has merger component 126 engaged so that the windrow is being discharged out of discharge end 128 of merger component 126. This causes the windrow 130 generated by windrower 100 (after cutting material 124) to be placed adjacent windrow 116A which was generated on the previous pass of windrower 100 through the field (shown in FIG. 2). This creates a double windrow 132 that has its center line or longitudinal axis 134 located at a position along a line that is offset from the travel path (or guidance line) 122 of windrower 100 by an offset distance represented by arrow 136. The offset distance (as discussed above with respect to FIG. 2) is a distance 136 roughly equivalent half of the cutting width of mower 107, or the distance between the travel path or guidance line 122 of windrower 100 and the side 131 of windrow 130 that is furthest from windrower 100.

Figure 4:
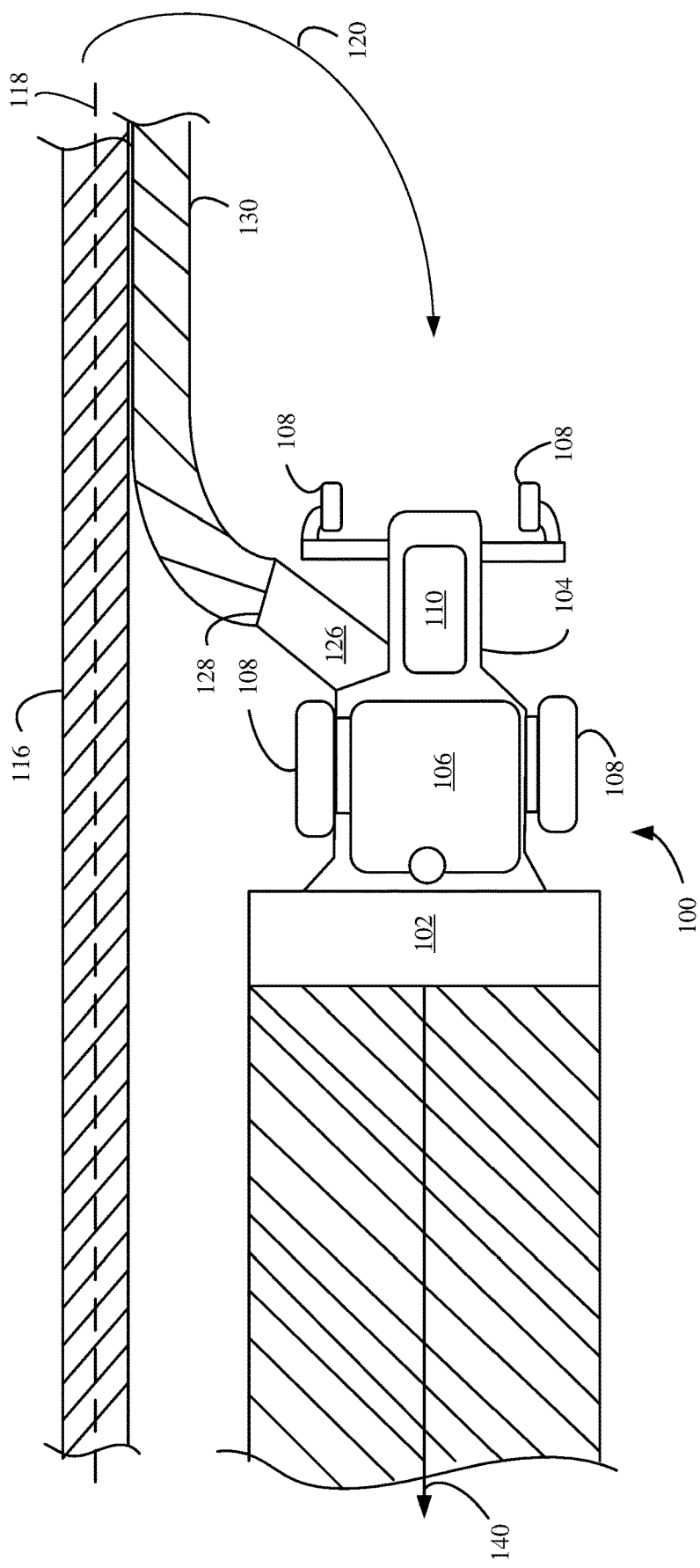
FIG. 4 and FIG. 5 are pictorial illustrations showing one example of a windrower with a merger component engaged to create a triple windrow.
Figure 5:
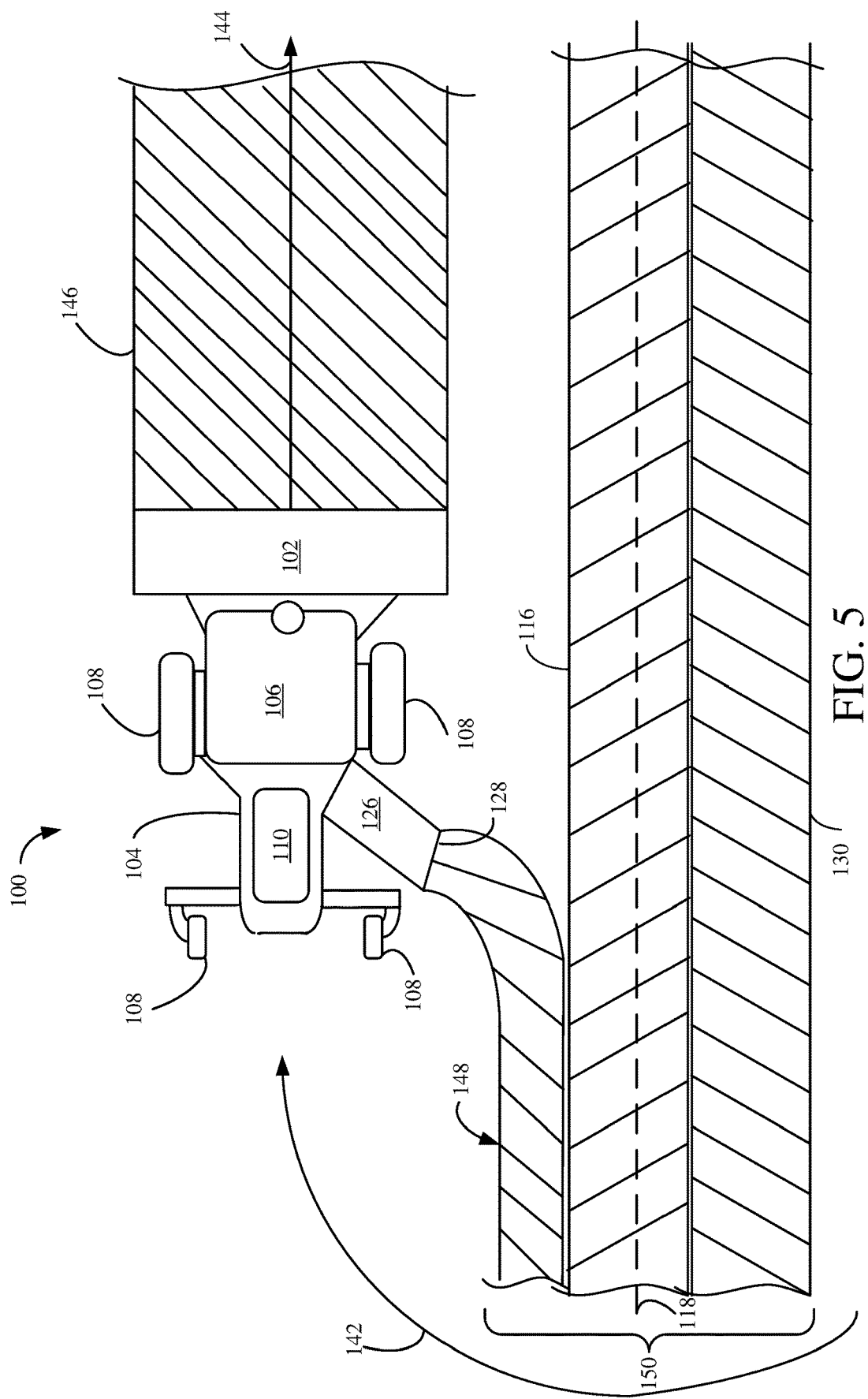

FIGS. 4 and 5 are pictorial illustrations indicating how windrower 100 can be operated to create a triple windrow. FIG. 4 is similar to FIG. 1, and similar items are similarly numbered. Therefore, FIG. 4 shows an example in which windrower 100, conducted a first pass 11 as discussed above with respect to FIG. 1 in which windrower 100 did not have the merger component 126 engaged. FIG. 4 thus shows that windrower 100 placed the first windrow 116 directly behind windrower 100 during the first pass. In the example shown in FIG. 4, windrower has executed a turn indicated by arrow 120 and is performing a second pass, adjacent the first pass, but with merger component 126 engaged so that windrower 100 is placing windrow 130 adjacent windrow 116. Thus, after the second pass in which windrower 100 is traveling generally along the travel path or guidance line 140, windrower 100 has created a double windrow comprising windrows 116 and 130.

FIG. 5 is another pictorial illustration, which is similar to FIG. 4, and similar items are similarly numbered. However, in FIG. 5 windrower 100 has now made a turn (after completing the pass shown in FIG. 4) generally in the direction indicated by arrow 142. Windrower 100 is now performing a third pass and traveling in the direction generally indicated by arrow, or guidance line 144. Merger component 126 is again engaged so that windrower 100 is now harvesting material 146 and placing a windrow 148 adjacent windrow 116, on the opposite side of windrow 130. The combined windrow 150 is thus a triple windrow which is comprised of windrows 116, 130, and 148. In the example shown in FIG. 5, the longitudinal axis (or center line) of combined windrow 150 is thus the same as the center line (or longitudinal axis) 118 of windrow 116.

As discussed above, it can be highly beneficial to map the location of the windrows generated by windrower 100 for a subsequent operation (such as for harvesting with a forage harvester, a baler, etc.). In addition, it can be beneficial to know the quantity of the material in the windrow. The location of the windrow (e.g., its center line or longitudinal axis) can be used in route planning, for refuel planning, and for a wide variety of other reasons and the quantity of material can be used to control power, ground speed, or other systems during a subsequent operation or for other reasons. Knowing the longitudinal axis or center line of the windrow (and/or quantity of material in the windrow) can also be very beneficial when the subsequent operation is being performed by an autonomous or semi-autonomous vehicle in which the vehicle navigates through the subsequent operation with little or no human involvement.

However, mapping the longitudinal axis or center line of a windrow can be difficult. This problem can be even more difficult when attempting to map the center line or longitudinal axis of a merged windrow, such as a double windrow, or a triple windrow.

Figure 6:
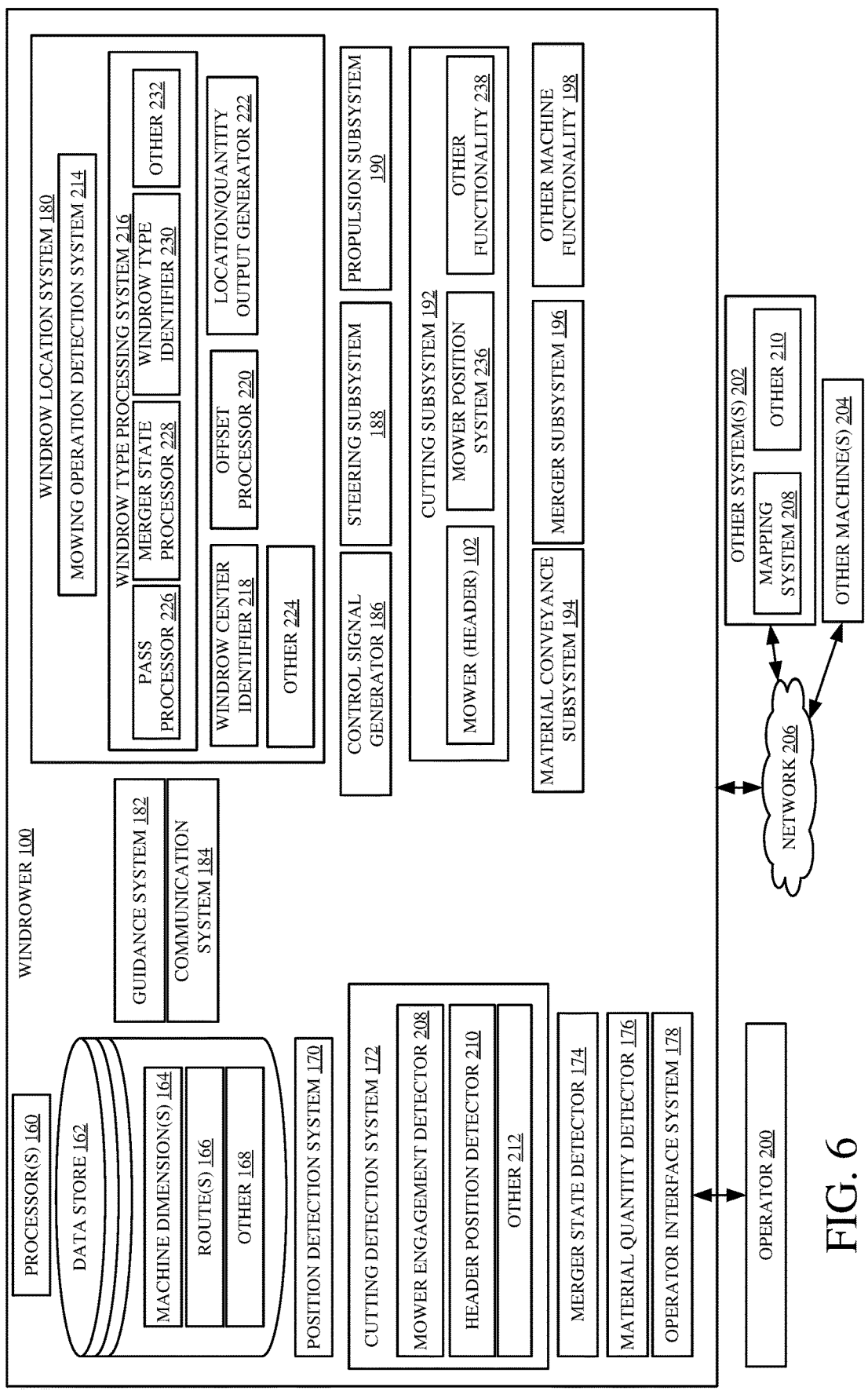
FIG. 6 is a block diagram showing one example of an agricultural system with a mobile agricultural machine (such as a windrower) in more detail.

FIG. 6 is a block diagram showing one example of an agricultural system 201 in which windrower 100 is shown in more detail. It should be noted that the block diagram of windrower 100 shown in FIG. 6 can be other agricultural machines that generate a windrow as well, and the agricultural machine shown in FIG. 6 is illustrated as a windrower 100 for the purposes of example only.

In the example shown in FIG. 6, windrower 100 includes one or more processors 160, data store 162 (which can store machine dimensions 164, routes 166, and other items 168), position detection system 170, cutting detection system 172, merger state detector 174, material quantity detector 176, operator interface system 178, windrow location system 180, guidance system 182, communication system 184, control signal generator 186, steering subsystem 188, propulsion subsystem 190, cutting subsystem 192, material conveyance subsystem 194, merger subsystem 196, and other functionality 198. FIG. 6 also shows that, in one example, windrower can be operated by an operator 200 and can also communicate with other systems 202 and other machines 204 over a network 206. Network 206 can thus be a wide area network, a local area network, a near field communication network, a cellular communication network, or any of a wide variety of other networks or combinations of networks. The other systems 202 can include farm manager systems, cloud-based systems, vendor systems, or other systems. The other systems 202 may include a mapping system 208 and other items 210. Mapping system 208 may receive information from windrower 100 and generate a map or route planning information based upon the locations of the windrows generated by windrower 100. Other machines 204 may include other windrowers, harvesters, or other machines that are to assist windrow 100 (such as refueling vehicles) or that are to perform subsequent operations, after windrower 100 generates a windrow.

Cutting detection system 172 can include mower engagement detector 208, header position detector 210, and other items 212. Windrow location system 180 can include mowing operation detection system 214, windrow type processing system 216, windrow center identifier 218, offset processor 220, location/quantity output generator 222, and other items 224. Windrow type processing system 216 can include pass processor 226, merger state processor 228, windrow type identifier 230, and other items 232. Cutting subsystem 192 can include mower (or header) 102, mower position system 236, and other cutting functionality 238. Before describing the overall operation of agricultural system 201, a description of some of the items in system 201 and their operation are first provided.

Position detection system 170 detects the position and may also detect the pose of windrower 100. Position detection system 170 can be a global navigation satellite system (GNSS) receiver, a dead reckoning system, a set of inertial measurement units, gyroscopic sensors, cellular triangulation sensors, or other sensors or systems that provide the position and pose of windrower 100. System 170 may also generate an output indicative of the speed of travel of windrower 100, or that can be used to derive the speed of travel of windrower 100. For example, a series of outputs from position detection system 170 can be analyzed to determine the direction of travel and travel speed of windrower 100. Position detection system 170 can be other systems and sensors as well.

Cutting detection system 172 detects characteristics of cutting subsystem 192. For instance, mower engagement detector 208 detects whether mower 102 is engaged. Header position detector 210 detects the position of mower 102 (such as whether mower 102 is raised or lowered to its cutting position, etc.). Detectors 208 and 210 can be any of a wide variety of different types of detectors, such as Hall Effect sensors, potentiometers, angle sensors, optical or other sensors. For instance, mower position system 236 may include hydraulic cylinders or other actuators that can be actuated to move mower 102 to different positions. Header position detector can detect the position or state of the actuators in mower position system 236 and thus provide an output indicative of the position of mower 102.

Merger state detector 174 detects whether the merger components 126 are engaged. The state of engagement of merger components 126 during different passes can be used to detect whether multiple windrows are being merged together to form a single larger windrow. Thus, merger state detector 174 may detect the angular position of merger components 126, the position of an actuator that moves merger components 126, or other characteristic of merger subsystem 196 that can be used to determine whether the merger components 126 are engaged.

Operator interface system 178 can include operator interface mechanisms that provide outputs to operator 200 and receive inputs from operator 200. For instance, operator interface system 178 can include linkages, levers, buttons, a steering wheel, one or more joysticks, peddles, knobs, and dials, among other items. Operator interface system 178 may also include visual, audio, and/or haptic output mechanisms that provide outputs to operator 200. For instance, operator interface system 178 can include an operator interface display that may display information and also display operator actuatable mechanisms to receive inputs from operator 200. The operator actuatable mechanisms can be operated using a point and click device, using touch gestures, or using other inputs (such as speech inputs, hand motions, etc.). The operator actuatable mechanisms can include links, icons, buttons, or other operator actuatable mechanisms that can be displayed on a display screen.

Material quantity detector 176 detects the quantity of material in the windrows generated by windrower 100. Therefore, material quantity detector 176 can be a mass flow sensor that senses the mass flow of material through windrower 100, an optical sensor, a power sensor, or other sensors that provide an indication of the quantity of material being deposited in the windrow being generated by windrower 100.

Guidance system 182 may receive a route 166 from a route planning system and control steering subsystem 188 and/or propulsion subsystem 190 to follow a guidance path identified by route 166. Thus, guidance system 182 can include a map processing system or other guidance components that can control the steering and propulsion of windrower 100 based upon a guidance line provided as part of a route 166 or provided in other ways from a mapping system or route generator.

Communication system 184 facilities the communication of items on windrower 100 among themselves, and also facilitates communication with other systems 202 and other machines 204. Therefore, communication system 184 may include a controller area network (CAN) bus and bus controller or other communication components that may depend on the type of network 206 over which communication system 184 is to communicate.

Windrow location system 180 detects the location (e.g., longitudinal axis or center line) of the windrow generated by windrower 100. The windrow location system 180 may detect (instead of the center line), the location of the edge of the windrow or the location of another characteristic or feature of the windrow. The present discussion proceeds with respect to windrow location system 180 detecting the location of the center line of the windrow for purposes of example only. The windrow location system 180 detects the location of the windrow regardless of whether the windrow is a single windrow, a double windrow, or a triple windrow. However, the location of the center line (or other characteristic) of the windrow may be determined in different ways depending on the type of windrow. Therefore, windrow location system 180 first detects inputs indicative of whether the windrow is a single, double, or triple windrow, and then detects the center line (or other location) of the windrow based upon that determination.

Mowing operation detection system 214 detects whether windrower 100 is mowing material based on inputs from cutting detection system 172. For instance, mowing operation detection system 214 may detect that the mower 102 is engaged and that the mower 102 is in the lowered, cutting position based on signals from cutting detection system 172. If that is the case, then mower operation detection system 214 generates an output indicating that the windrower 100 is indeed mowing. However, if mower 102 is either not engaged or is raised out of the cutting position, then mowing operation detection system 214 may generate an output indicating that windrower 100 is not mowing. Mowing operation detection system 214 may generate the output indicative of whether windrower 100 is mowing based on other information as well. For instance, system 214 may receive an input from position detection system 170 indicative of the location of windrower 100 and its direction of travel. Detection system 214 may also receive an input indicating whether the present location of windrower 100 has already been mowed. If the current location of windrower 100 has already been mowed, then windrower 100 is likely not mowing. System 214 may generate the output indicative of whether windrower 100 is mowing based on that or other information as well.

Windrow type processing system 216 processes various inputs and generates an output indicative of the type of windrow being generated by windrower 100 (such as whether this is a single, double, or triple windrow). Pass processor 226 keeps track of the different passes of windrower 100 through a field. For instance, pass processor 226 may receive an input from route 166 or guidance system 182 as well as the position detection system 170 to indicate which pass windrower 100 is currently making through the field, the direction of travel of windrower on each pass, etc. Pass processor 236 may receive and input indicating that the direction of windrower 100 has changed 180 degrees to also determine which pass windrower 100 is making through the field and the direction of movement of windrower 100 during each pass. Pass processor 226 can receive such information to also determine whether windrower 100 is making an adjacent pass, which is adjacent to a previous pass on either side of the previous pass, or whether windrower 100 is making a pass that is not adjacent to a pervious pass.

Merger state processor 228 receives an input from merger state detector 174 to determine the state of merger components 126. For instance, if merger state detector 174 provides an output indicative of the angular position of merger components 126, then merger state processor 228 may provide an output indicating whether the merger components 126 are engaged so that windrower 100 is performing a merger operation, or whether the merger components 126 are disengaged indicating that the windrower 100 is not performing a merging operation.

Windrow type identifier 230 receives inputs from pass processor 226 and merger state processor 228 and, based upon those inputs, determines the type of windrow that is being generated by windrower 100. For instance, windrow type identifier 230 may receive an input from pass processor 226 indicating that windrower 100 is performing a current pass that is adjacent to the most recent previous pass. Windrow type identifier 230 may receive an input from merger state processor 228 indicating that the merger components 126 were engaged both during the previous pass and during the current pass. In that case, windrow type identifier 230 may generate an output indicating that the current windrow being generated by windrower 100 is a double windrow. However, if windrow type identifier 230 receives an input from merger state processor 228 indicating that the merger component is not engaged, then windrow type identifier 230 may generate an output indicating that windrower 100 is currently generating a single windrow. Also, if windrow type identifier 230 receives inputs from pass processor 226 and merger state processor 228 indicating that windrower 100 has performed a first pass generating a single windrow, a second pass, adjacent the first pass, with the merger component 126 engaged, and is now performing a third pass, also adjacent the first pass (but on the opposite side of the second pass) with the merger components 126 engaged, then windrow type identifier 230 generates an output indicating that windrower 100 is currently generating a triple windrow.

Windrow center identifier 218 then identifies the location of the center of the windrow currently being generated by windrower 100 based upon the type of windrow being detected. For instance, if the windrow currently being detected is a single windrow, then windrow center identifier 218 identifies the center of the windrow (the longitudinal axis of the windrow) as being the same as the guidance line or current travel path of windrower 100. Also, if the current windrow is a double windrow then windrow center identifier 218 identifies the center of the current windrow as the current travel path or guidance line of windrower 100, offset by half of the cutting width of mower 102. If mower 102 is mounted on an asymmetric head (meaning that more material is being mowed on one or the other side of the guidance line or travel path of windrower 100), then the center line of the windrow currently being generated by windrower 100 is adjusted based upon the size of the offset of mower 102 from the center line or travel path of windrower 100. If the windrow currently being generated by windrower 100 is a triple windrow, then the windrow center identifier 218 identifies the center of the windrow as the center line or travel path of windrower 100 for the first pass (middle pass) in the triple windrow, where the merger component 126 was not engaged. Again, if mower 102 is mounted on an offset header, offset processor 220 can make adjustments for the offset of the asymmetric head.

It will also be noted that if windrower 100 is making a turn or operating in a circular route, then offset processor 220 can make adjustments to accommodate for the fore-aft distance to the discharge end of the windrower 100 or merger components 126 to improve the accuracy in identifying the location of the windrow under those circumstances.

Location/quantity output generator 222 may also receive an input from material quantity detector 176 which is indicative of the quantity of material in the windrow. Location/quantity output generator 222 can then generate an output indicating the location of the windrow (e.g., the center line of the windrow or longitudinal axis of the windrow) along with a quantity identifier identifying the quantity of material in the windrow at different points along the center or longitudinal axis of the windrow.

Control signal generator 176 may receive an output from window location system 180 and from other items in windrower 100 and generate control signals to control steering subsystem 188, propulsion subsystem 190, cutting subsystem 192, material conveyance subsystem 194, merger subsystem 196, and other machine functionality 198, as well as to control communication system 184 and operator interface system 178. For instance, control signal generator 186 may generate an output controlling communication system 184 to generate a communication signal to other machines to 204 or to mapping system 208 in other systems 202. Mapping system 208 may generate a map identifying the location and quantity of material in the windrow currently being generated by windrower 100. The map can be downloaded to other machines 204 or the output from control signal generator 186 can be directly output to other machines 204. By way of example, where other machines 204 include a forage harvester or other harvester, the steering and ground speed of the other machine 204 can be controlled based upon the location and quantity of material in the windrow generated by windrower 100. For instance, if a slug (e.g., an abnormally large quantity of material) is located at a certain location along the windrow, then the machine speed of the harvester can be slowed down as the harvester approaches that slug of material so that the mass flow of material through the harvester remains generally constant, or within other desired limits. Control signal generator 186 can generate control signals to control other items as well.

Steering subsystem 188 can be any of a wide variety of different types of systems to control the direction of travel of windrower 100. Steering subsystem 188 can include steerable wheels or tracks or other ground engaging mechanisms that are controlled in a skid steer or other fashion, etc. Propulsion subsystem 190 can include an engine that drives the ground engaging elements 108 through a transmission. Propulsion system 190 can include hydraulic motors, electric motors, or other motors that can be used to drive the ground engaging elements 108 individually or in groups.

Material conveyance subsystem 194 can be a belt, or other conveyer, or other conveyance subsystem that is used to move the material, after it is cut by mower 102, out of windrower 100 into a windrow, as desired. For instance, the mower 102 may be mounted on a header with a draper belt or other conveyer that moves the mowed material through windrower 100.

Merger subsystem 196 can include the merger components 126 which direct the movement of material in a desired direction relative to windrower 100. For example, merger subsystem 196 can include an actuator that pivots merger components 126 so that they direct the windrow out the side of windrower 100, etc.

Figure 7A:
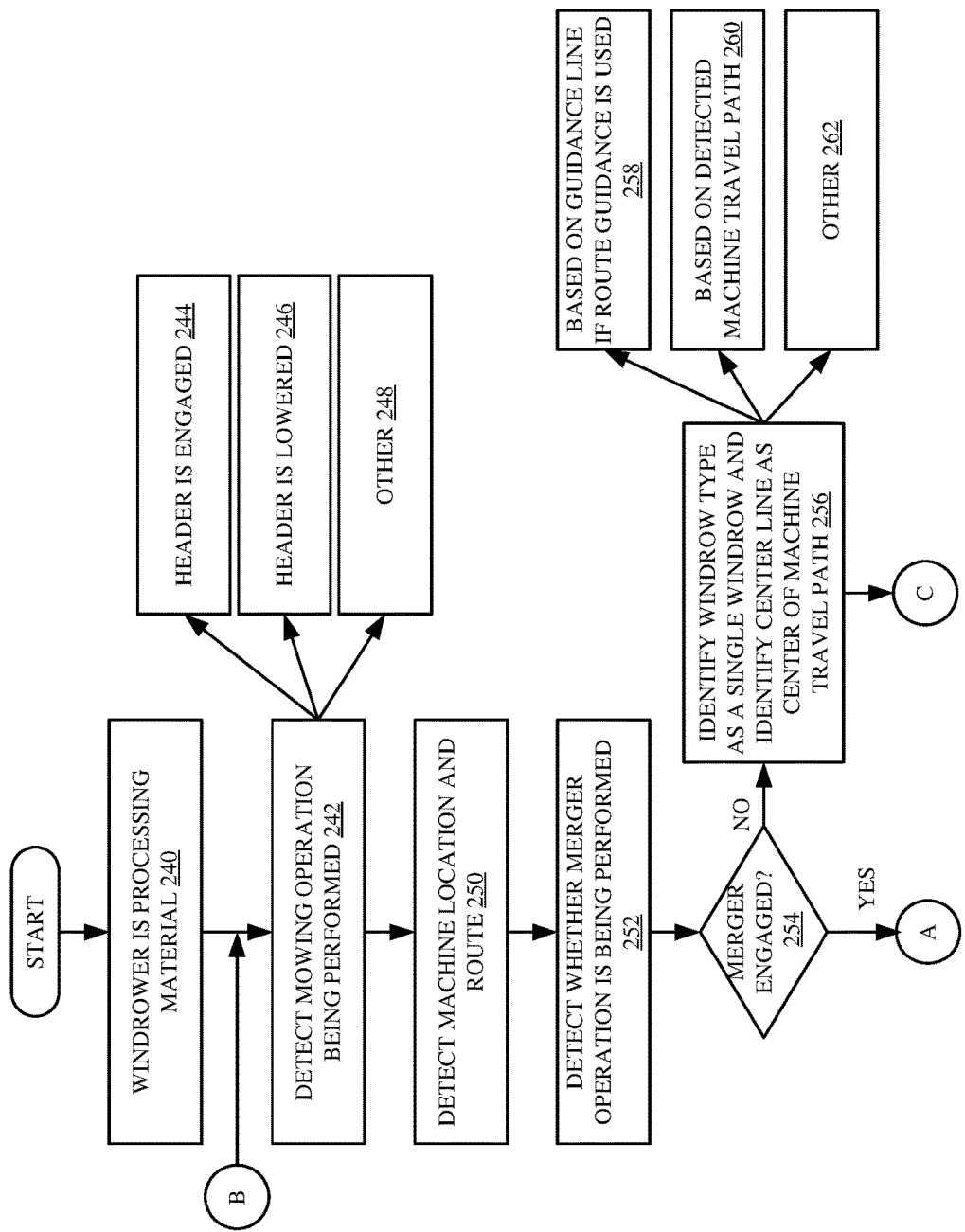
FIGS. 7A, 7B, and 7C (collectively referred to as FIG. 7) show a flow diagram illustrating one example of the operation of a windrower.
Figure 7B:
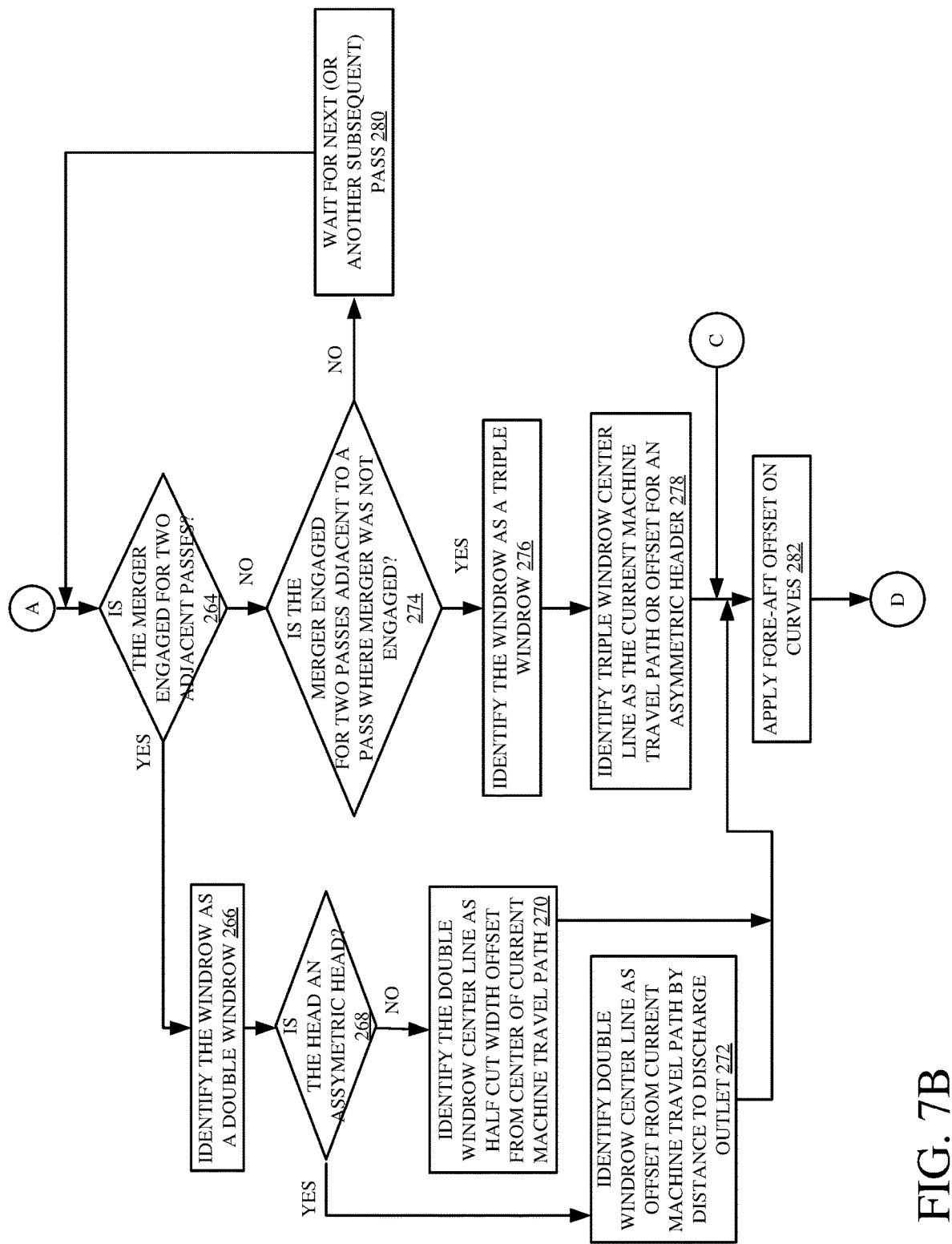
Figure 7C:
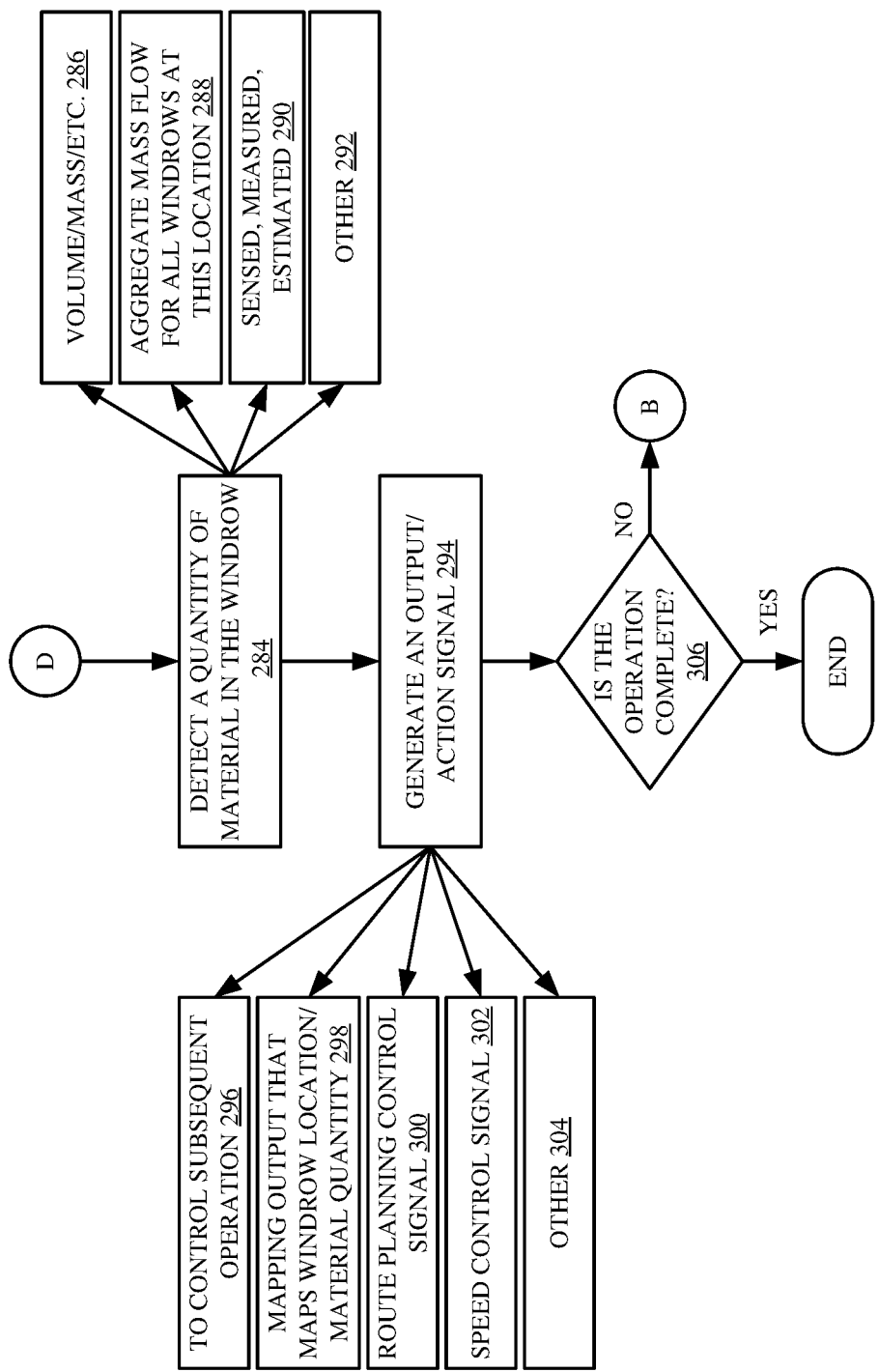

FIGS. 7A, 7B, and 7C (collectively referred to herein as FIG. 7) show a flow 4 diagram illustrating one example of the operation of agricultural system 201 shown in FIG. 6. It is first assumed that windrower 106 is processing material (such as cutting material and placing it in a windrow). Processing material in this way is indicated by block 240 in the flow diagram shown in FIG. 7.

Mowing operation detection system 214 receives signals from cutting detection system 172 and determines that a mowing operation is being performed, as indicated by block 242. Mower engagement detector 208 detects that the mower 102 is engaged and is operating, as indicated by block 244. Header position detector 210 then detects the position of mower 102 indicating that mower 102 is lowered to its mowing position, as indicated by block 246. Receiving these signals and detecting that the mowing operation is being performed can be done in other ways as well, as indicated by block 248.

Windrow location system 180 then performs various steps to identify the center line (or longitudinal axis) of the windrow that is being generated by windrower 100. Position detection system 170 provides windrow location system 180 with a position signal indicative of the location and route of windrower 100, as indicated by block 250.

Merger state processor 228 detects whether windrower 100 is currently performing a merger operation. For instance, merger state processor 228 can receive an input from merger state detector 174 indicating whether the merger components 126 are engaged and merging multiple windrows together. Detecting whether the merger operation is being performed is indicated by block 252 in the flow diagram of FIG. 7.

If the merger components 126 are not engaged, so that merger is not being performed, as determined by merger state processor 228 at block 254, then windrow type identifier 230 identifies the windrow type as a single windrow and the center line of the windrow is identified as the center of the current machine travel path. Identifying the windrow type and the center line of the windrow is indicated by block 256. The center line of the travel path can be based upon the guidance line for windrower 100 if guidance system 182 is being used to process the route guidance, as indicated by block 258. The center line of the windrow can also be based upon the detected machine travel path, which may be output based on the signal from position detection system 170 or in other ways. Identifying the center line of the windrow based on the detected machine travel path is indicated by block 260. The windrow type and center line of the windrow can be identified in other ways as well, as indicated by block 262.

If, at block 254, merger state processor 228 determines that merger is taking place, then pass processor 226 determines whether the merger has been engaged for two adjacent passes where merger components 126 are oriented to combine the windrows for those two adjacent passes, as indicated by block 264.

If the merger has been engaged for two adjacent passes to combine the windrows, then windrow type identifier 230 identifies the windrow as a double windrow, as indicated by block 266. Windrow center identifier 218 determines whether the head that is carrying mower is an asymmetric head, as indicated by block 268. If not, then windrow center identifier 218 identifies the center line of the double windrow as a half-cut width offset from the center of the current machine travel path (e.g., the current machine guidance line or the detected travel path of the machine), as indicated by block 270.

If, at block 268, it is determined that the head is an asymmetric head, then offset processor 220 identifies the double windrow center line as a line that includes an offset from the current machine travel path to account for the asymmetric head. Identifying the double windrow center line for a windrower 100 with an asymmetric head is indicated by block 272 in the flow diagram of FIG. 7.

If at block 264 it is determined that the merger is not being engaged for two adjacent passes, then pass processor 226 determines whether the merger has been engaged for two passes that are both adjacent to a pass where the merger was not engaged, and that are on opposite sides of the pass where the merger was not engaged, with the merger components 126 oriented to combine the windrows. Making this determination is indicated by block 274 in the flow diagram of FIG. 7. If that is the case, the merger components 126 have been engaged for two consecutive passes that are both adjacent to a pass where the merger was not engaged. Thus, windrow type identifier 230 identifies the windrow type as a triple windrow. Identifying the windrow type as a triple windrow is indicated by block 276 in the flow diagram of FIG. 7.

Windrow center identifier 218 then identifies the triple windrow center line as the machine travel path of the pass which is between the two passes where the merger components where engaged (e.g., the machine travel path, or guidance lines of the machine for the path where the merger component was not engaged). That pass will be the center pass of the triple windrow and thus the center line of the windrow generated during that pass will be the center line of the triple windrow. If the header is offset, then offset processor 220 will offset the center line of the windrow travel path by the offset distance of the header. Identifying the center line of the triple window is indicated by block 278 in the flow diagram of FIG. 7.

If, at block 274, it is determined that the merger components 126 have not been engaged for two different passes that are adjacent a center pass where the merger was not engaged, then windrow type identifier 230 cannot yet identify the windrow type. Therefore, windrow type identifier 230 waits for a subsequent pass to determine whether it can identify the windrow type, and processing continues at block 264. Waiting for the next pass or another subsequent pass is indicated by block 280 in the flow diagram of FIG. 7.

When windrower 106 goes around a curve, there may well be an offset due to the fore-aft separation of the position detector on windrower 100 and the mower discharge area, or the offset between the position detector and the merger discharge area. Applying a fore-aft offset on curves, to the center line of the windrow, is indicated by block 282 in the flow diagram of FIG. 7.

Where the quantity of material at various locations in the windrow is also detected, then material quantity detector 176 detects a quantity of the material in the windrow, at different locations in the windrow (or continuously) as windrower 100 travels along the field and generates the windrow. Detecting a quantity of material in the windrow is indicated by block 284 in the flow diagram of FIG. 7. The quantity of material can be represented by any of a wide variety of different parameters, such as volume, mass, etc., as indicated by block 286. The quantity of material can be an aggregated value that is aggregated for multiple individual windrows that are merged into a single windrow. For instance, where the windrow is a double windrow, the quantity of material in the double windrow may be an aggregated value indicative of the quantity of material in each of the two individual windrows that are merged to generate the double windrow, at a particular location. Where the windrow is a triple windrow, the aggregated value can be aggregated from the quantity values in each of the three individual windrows that are merged to generate the triple windrow. Detecting the quantity of material as an aggregated value for all windrows merged into a single windrow at a given location is indicated by block 288 in the flow diagram of FIG. 7. The quantity of material can be sensed, measured, estimated, or detected in other ways, as indicated by blocks 290 and 292 in the flow diagram of FIG. 7.

Location/quantity output generator 222 generates an output indicative of the quantity of material in the windrow and the location of the windrow. Control signal generator can generate an action signal based upon the output from location/quantity output generator 222. Generating an output/action signal is indicated by block 294 in the flow diagram of FIG. 7.

Control signal generator 186 or the output from output generator 222 can be used to generate a control signal to control a subsequent operation. For instance, the location of the windrow can be used to control the steering system of a harvester that is subsequently harvesting the windrow. In another example, the quantity of material at the different locations can be used to control the propulsion system (or power system) of a harvester performing a subsequent harvesting operation in order to control the quantity of material passing through the harvester. Generating a control signal to control a subsequent operation is indicated by block 296 in the flow diagram of FIG. 7.

The mapping output can be provided to a mapping system (such as mapping system 208 in FIG. 1) to map the location of (and possibly the quantity of material in) the windrow, as indicated by block 298. The windrow location and quantity can be output to a route planning system in order to generate a route planning signal to generate a route 166 for a machine performing a subsequent operation, as indicated by block 300. The output can be used to generate a speed control signal for the subsequent operation as indicated by block 302. The output can be used to generate another control signal as well, as indicated by block 304. Unless the operation is complete, as determined at block 306, then processing reverts to block 242 where the system continues to detect whether the mowing operation is being performed, whether a merger operation is being performed, etc.

It can thus be seen that the present description describes a system in which the type of windrow is detected based upon whether a merger operation is being performed, and based upon the types of operations (e.g., merger/non-merger) that were being performed in adjacent passes on the field. The location (e.g., center line) of the windrow is then identified, based upon the windrow type. The quantity of material in the windrow can also be detected, and an output is generated identifying the location and quantity of material in the windrow. An action signal is generated based upon that output. For instance, the location and quantity of material in the windrow can be mapped. The location and quantity of material can be used for route planning. The location and quantity of material can be used in a guidance system. The location and quantity of material can be used to control speed of a subsequent operation, or a wide variety of other things.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, subsystems, identifiers, generators, processors, components and/or logic. It will be appreciated that such systems, subsystems, identifiers, generators, processors, components and/or logic can be comprised of hardware items (such as processors and associated memory, or other processing components, some of which are described below) that perform the functions associated with those systems, subsystems, identifiers, generators, processors, components and/or logic. In addition, the systems, subsystems, identifiers, generators, processors, components and/or logic can be comprised of software that is loaded into a memory and is subsequently executed by a processor or server, or other computing component, as described below. The systems, subsystems, identifiers, generators, processors, components and/or logic can also be comprised of different combinations of hardware, software, firmware, etc., some examples of which are described below. These are only some examples of different structures that can be used to form the systems, subsystems, identifiers, generators, processors, components and/or logic described above. Other structures can be used as well.

Figure 8:
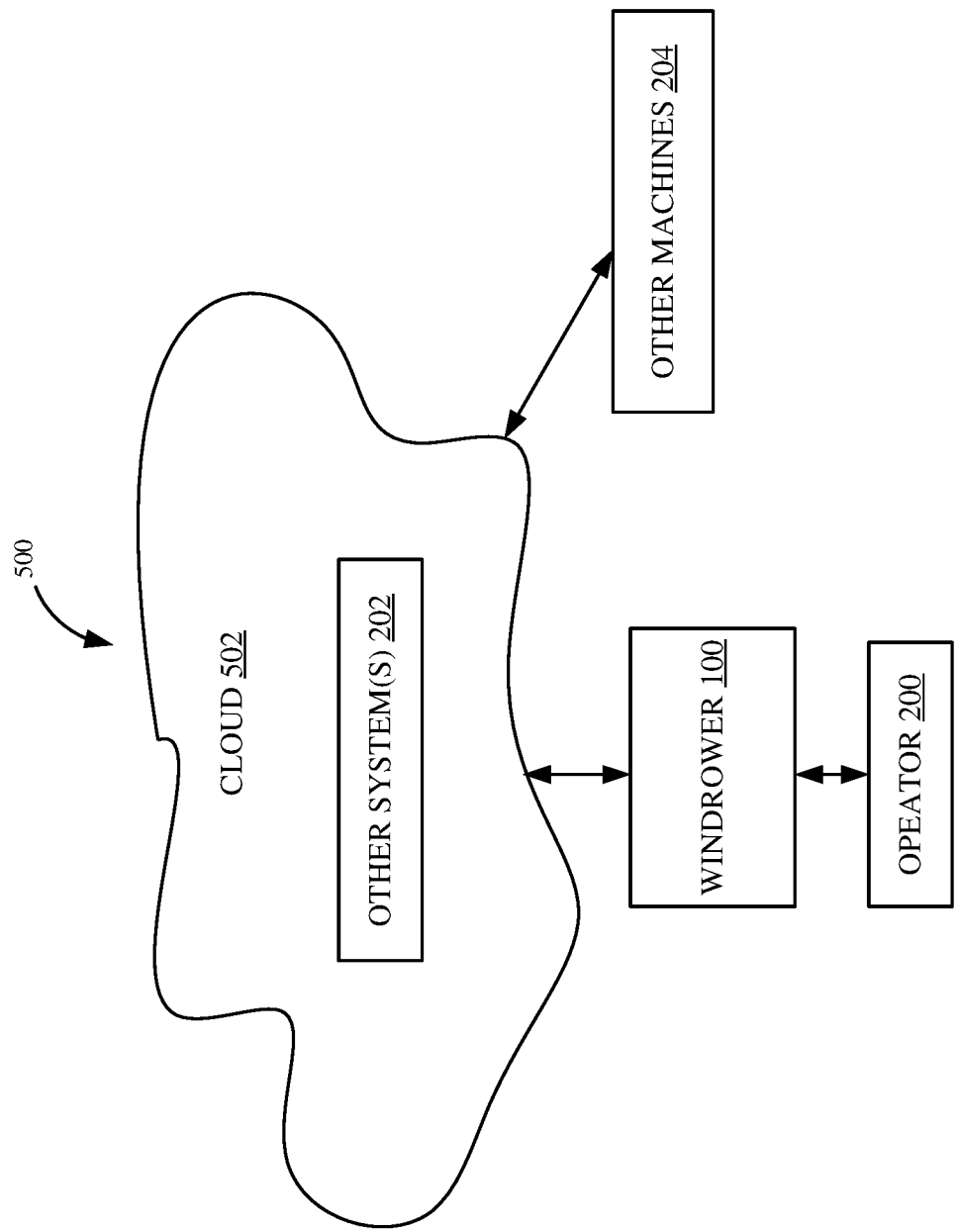
FIG. 8 is a block diagram showing one example of an agricultural machine deployed in a remote server environment.

FIG. 8 is a block diagram of windrower 100, shown in FIG. 6, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 8, some items are similar to those shown in previous FIGS. and they are similarly numbered. FIG. 8 specifically shows that other systems 202 can be located at a remote server location 502. Therefore, windrower 100 accesses those systems through remote server location 502.

Regardless of where the items are located, the items can be accessed directly by windrower 100, or other machines 204 through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the windrower comes close to the fuel truck for fueling, the system automatically collects the information from the windrower using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the windrower until the windrower enters a covered location. The windrower, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
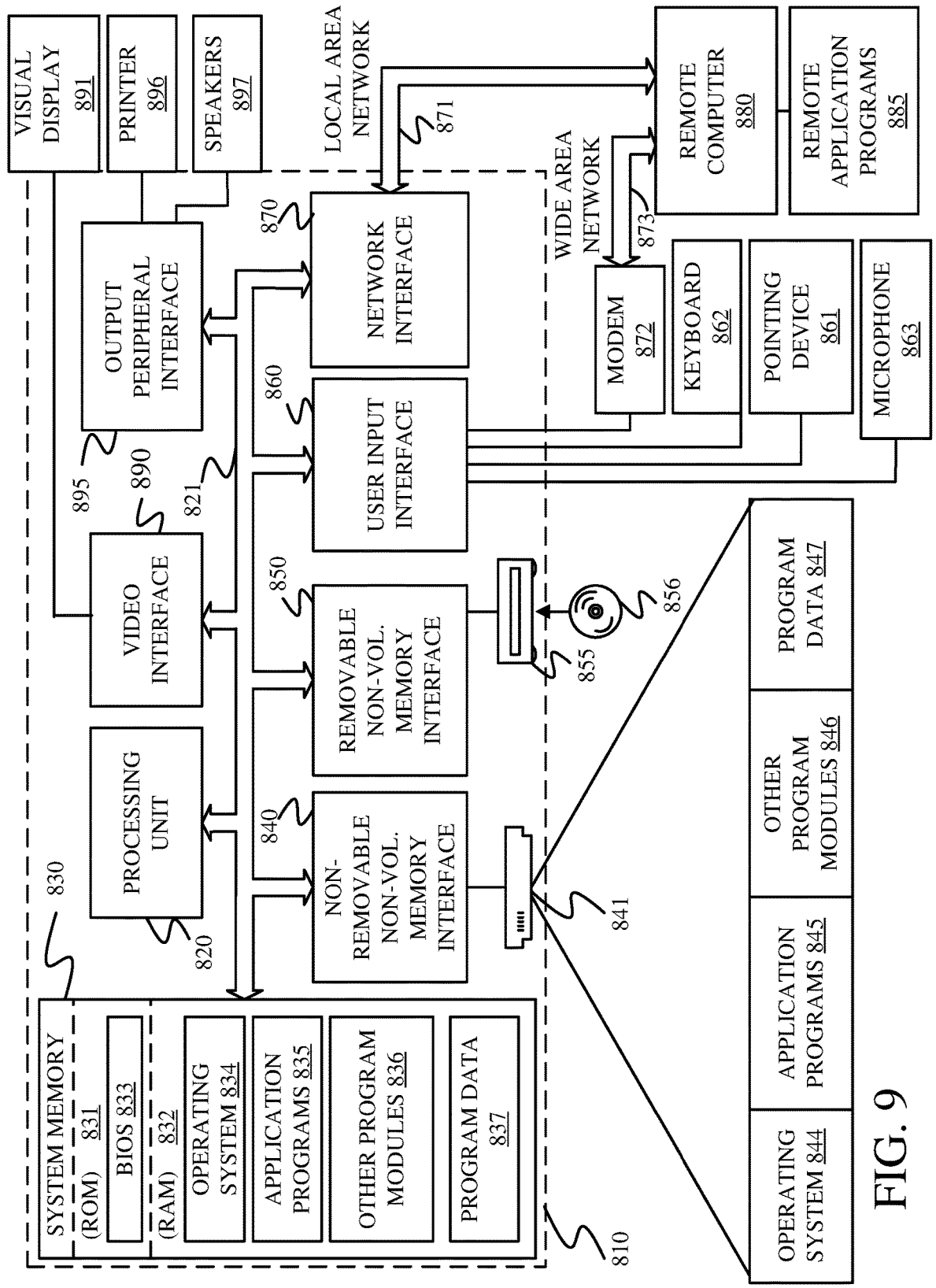
FIG. 9 is a block diagram showing one example of a computing environment.

FIG. 9 is one example of a computing environment in which elements of previous FIGS., or parts of it, (for example) can be deployed. With reference to FIG. 9, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but May be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   detecting whether a merger component is engaged on a windrower to obtain a merger state;
   detecting a location of the windrower as the windrower moves through a field cutting material;
   identifying a pass type based on the location of the windrower and a location of a previous pass;
   identifying a windrow type based on the merger state and the pass type;
   generating a windrow location signal indicative of a center of the windrow based on the location of the windrower and the windrow type; and
   performing a machine action based on the windrow location signal indicative of the center of the windrow.

2. The computer implemented method of claim 1 wherein detecting a location of the windrower comprises:
   detecting a location of a travel path of the windrower as the windrower travels through the field.

3. The computer implemented method of claim 1 wherein detecting a location of a windrower comprises:
   detecting a location of a guidance line, generated by a guidance system, that guides steering of the windrower through the field.

4. The computer implemented method of claim 1 wherein identifying a windrower type comprises:
   identifying the windrow type as a single windrow based on detecting that the merger component is disengaged.

5. The computer implemented method of claim 4 wherein generating a windrow location signal comprises:
   identifying a location of a longitudinal axis of the single windrow based on the location of the windrower; and
   generating a location signal identifying the longitudinal axis of the single windrow.

6. The computer implemented method of claim 1 wherein identifying a windrower type comprises:
   identifying the windrow type as a double windrow based on the merger component being engaged on two adjacent passes of the windrower through the field.

7. The computer implemented method of claim 6 wherein generating a windrow location signal comprises:

identifying a location of a longitudinal axis of the double windrow based on the location of the windrower and an offset from the location of the windrower to a discharge end of the merger component; and generating a location signal identifying the longitudinal axis of the double windrow.

8. The computer implemented method of claim 1 wherein identifying a windrower type comprises:

identifying the windrow type as a triple windrow based on the merger component being engaged on two passes of the windrower through the field, each of the two passes being adjacent, and on opposite sides of, a pass during which the merger component is disengaged.

9. The computer implemented method of claim 8 wherein generating a windrow location signal comprises:

identifying a location of a longitudinal axis of the triple windrow based on the location of the windrower along the pass during which the merger component is disengaged; and generating a location signal identifying the longitudinal axis of the triple windrow.

10. The computer implemented method of claim 1 and further comprising:

detecting a quantity of material in the windrow at different locations in the windrow; and generating a windrow location/quantity signal indicative of the quantity of material at different locations of the windrow based on the detected quantity of material in the windrow.

11. The computer implemented method of claim 10 wherein detecting a quantity of material in the windrow comprises:

detecting a quantity of material in each of a plurality of different windrows that are merged into a single windrow; and aggregating the quantity of material detected in each of a plurality of different windrows.

12. The computer implemented method of claim 1 wherein generating an action signal comprises at least one of:

generating a route planning signal indicative of a route of an agricultural machine that performs a subsequent operation in the field;

generating a map of the windrow;

generate a steering control signal to control a steering subsystem of a harvester that harvests the windrow;

generating a propulsion control signal to control a speed of the harvester; or generating a control signal to control a mass flow of material through the agricultural machine performing the subsequent operation.

13. The computer implemented method of claim 1 and further comprising:

detecting a mower engagement state indicative of whether a mower is engaged;

detecting a mower position indicative of whether the mower is in a mowing position; and determining whether the windrower is cutting the material and generating the windrow based on the mower engagement state and the detected mower position.

14. An agricultural system, comprising:

a merger state detector detecting a merger state indicating whether a merger component is engaged on a windrower;

a position detection system detecting a location of the windrower as the windrower moves through a field cutting material;

a windrow type identifier identifying a windrow type based on the merger state and a pass type that is based on the location of the windrower and a location of a previous pass;

a location output generator generating a windrow location signal indicative of a center of the windrow based on the location of the windrower and the windrow type; and a control signal generator performing a machine action based on the windrow location signal indicative of the center of the windrow.

15. The agricultural system of claim 14 wherein the windrower type identifier is configured to identify the windrow type as a single windrow based on the merger state detector detecting that the merger component is disengaged and further comprising:

a windrow center identifier that identifies, as the location of the windrow, a longitudinal axis of the single windrow based on the location of the windrower.

16. The agricultural system of claim 15 wherein the windrow type identifier identifies the windrow type as a double windrow based on the merger component being engaged on two adjacent passes of the windrower through the field and wherein the windrow center identifier identifies, as the location of the windrow, a location of a longitudinal axis of the double windrow based on the location of the windrower and an offset from the location of the windrower to a discharge end of the merger component.

17. The agricultural system of claim 16 wherein the windrow type identifier identifies the windrow type as a triple windrow based on the merger component being engaged on two passes of the windrower through the field, each of the two passes being adjacent, and on opposite sides of, a pass during which the merger component is disengaged.

18. The agricultural system of claim 17 wherein the windrow center identifier identifies the windrow location by identifying a location of a longitudinal axis of the triple windrow based on the location of the windrower along the pass during which the merger component is disengaged.

19. The agricultural system of claim 14 and further comprising:

a material quantity detector detecting a quantity of material in the windrow at different locations in the windrow, wherein the location output generator generates a windrow quantity signal indicative of the quantity of material at different locations of the windrow based on the detected quantity of material in the windrow.

20. An agricultural system, comprising:

at least one processor; and a data store storing computer executable instructions which, when executed by the at least one processor, cause the at least one processor to perform steps, comprising:

receiving a merger state signal indicative of whether a merger component is engaged on a windrower;

detecting a location of the windrower as the windrower moves through a field cutting material;

identifying a pass type based on the location of the windrower and a location of a previous pass;

identifying a windrow type based on the merger state signal and the pass type;

generating a windrow location signal indicative of a center of the windrow based on the location of the windrower and the windrow type; and performing a machine action based on the windrow location signal indicative of the center of the windrow.

\* \* \* \* \*